United States Patent [19]

Bobbitt, III

[11] Patent Number: 5,718,131
[45] Date of Patent: Feb. 17, 1998

[54] STEERING COLUMN LOCKING ASSEMBLY

[75] Inventor: John Thomas Bobbitt, III, Warwickshire, England

[73] Assignee: The Torrington Company, Torrington, Conn.

[21] Appl. No.: 609,008

[22] Filed: Feb. 28, 1996

[30] Foreign Application Priority Data

Mar. 2, 1995 [GB] United Kingdom ............... 9504165

[51] Int. Cl.$^6$ ........................................... B60R 25/02
[52] U.S. Cl. ..................... 70/184; 29/517; 70/186; 70/252; 403/275; 403/282; 464/32; 464/89
[58] Field of Search ............... 70/182, 252, 183–186; 74/492; 403/282, 284, 275; 464/32, 89, 181, 182; 29/516, 517

[56] References Cited

U.S. PATENT DOCUMENTS

| | | | |
|---|---|---|---|
| 1,251,987 | 1/1918 | McFarland | 70/185 |
| 3,824,665 | 7/1974 | Saito | 29/200 B |
| 4,304,147 | 12/1981 | Linnemeier et al. | 74/492 |
| 4,750,380 | 6/1988 | Hoblingre et al. | 70/185 X |
| 4,854,141 | 8/1989 | Haldric et al. | 70/182 |

FOREIGN PATENT DOCUMENTS

| | | |
|---|---|---|
| 0 035 415 | 9/1981 | European Pat. Off. . |
| 0 129 522 | 12/1984 | European Pat. Off. . |
| 0 206 861 | 12/1986 | European Pat. Off. . |
| 0216651 | 4/1987 | European Pat. Off. ............. 70/252 |
| 0381554 | 8/1990 | European Pat. Off. ............. 70/252 |
| 3435084 | 4/1986 | Germany ............. 70/252 |
| 3629639 | 3/1988 | Germany ............. 70/252 |
| 0073349 | 4/1984 | Japan ............. 70/252 |
| 2 187 422 | 9/1987 | United Kingdom . |

*Primary Examiner*—Lloyd A. Gall
*Attorney, Agent, or Firm*—Michael H. Minns; Robert F. Palermo

[57] ABSTRACT

A steering column locking assembly and method of making same includes swaging a steering column tube and a steering column lock collar in such a manner that relative movement between the two parts is resisted below a predetermined level of torque while relative rotation occurs at values of torque above the predetermined value. A layer of plastics material may be provided between the two parts. Once the predetermined torque is overcome, then rotation between the two parts occurs, but ceases once the torque level drops below the predetermined level.

7 Claims, 1 Drawing Sheet

STEERING COLUMN LOCKING ASSEMBLY

BACKGROUND OF THE INVENTION

This invention relates to a steering column locking assembly.

Vehicle steering columns incorporate devices to inhibit vehicle theft. Two known types incorporate a fixed lock bolt and a tolerance ring to hold a lock collar in position. One type has the lock collar on the steering column tube and the other type has the lock collar on a steering wheel hub. Both of these types require tight tolerances on the components in order to achieve the torque profiles required. In addition, in practice, one of the materials required needs to be extremely hard, requiring non-standard material.

The foregoing illustrates limitations known to exist in present steering column locking assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering column lock assembly comprising: a cylindrical steering column tube; and a hollow cylindrical lock collar attached to the steering column tube by mechanical reduction of the diameter of a portion of lock collar, the lock collar having a plurality of circumferentially spaced axially extending slots.

The foregoing and other aspects will become apparent from the following detailed description of the invention when considered in conjunction with the accompanying drawing figures.

BRIEF DESCRIPTION OF THE DRAWING FIGURES

FIG. 1 is a diagrammatic side view, partly in cross-section, of a steering column locking assembly, and FIG. 2 is a perspective view of a lock collar shown in FIG. 1 but prior to forming.

DETAILED DESCRIPTION

Figure 1:
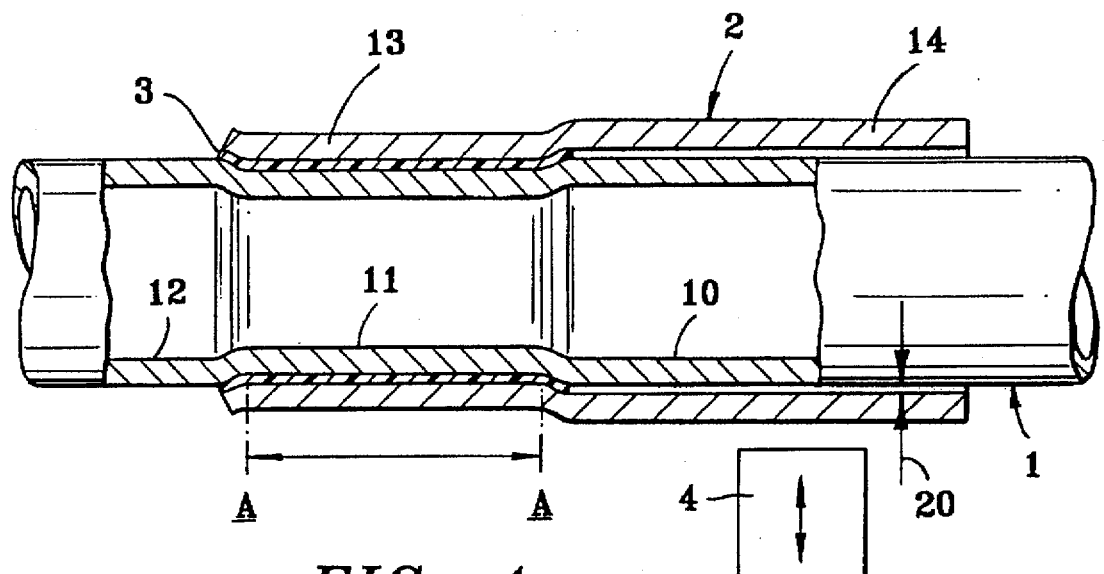
Figure 2:
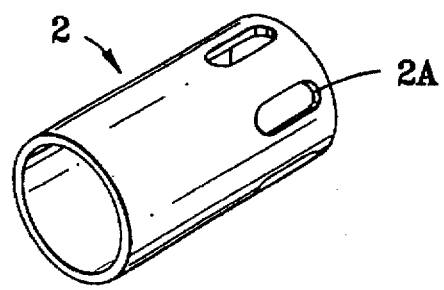

According to one aspect of the present invention, there is provided a steering column locking assembly comprising a first part and a second part, one of said parts being a steering column tube with an outer portion of circular section and the other of said parts being a steering column lock collar having a cylindrical inner portion fitting on said outer portion of the steering column tube and said first part being swaged on said second part, such that relative movement between the two parts is resisted below a predetermined level of torque while relative rotation occurs at values of torque above said predetermined value.

According to another aspect of the present invention, there is provided a method of making a steering column locking assembly comprising a first part and a second part, one of said parts being a steering column tube having an outer portion of circular section and the other of said parts being a steering column lock collar having a cylindrical inner portion fitting on said outer portion of said steering column, the method comprising swaging said first part onto said second part in such a manner that the two parts resist relative movement below a predetermined torque value and allow relative rotation at torque above said predetermined value.

Preferably, said first part is the steering column lock collar and the second part is the steering column tube.

The swaging may be such as to cause deformation of one or both of said parts.

A layer of plastics material may be provided between the two parts. The plastics material layer may be a separate layer and/or may be provided on the inside of the lock collar and/or on the outer portion of the steering column tube.

The invention also extends to a vehicle steering column incorporating such a locking assembly and to a vehicle incorporating same.

The drawing shows a cylindrical upper steering column tube 1 about which is fitted a cylindrical lock collar 2. Prior to fitting, the lock collar 2 is basically unformed and, once in place, is swaged into position onto a cylindrical outer portion of the steering column tube 1.

The lock collar 2 can be mechanically reduced to attach the lock collar to the steering column tube 1 by a Vailling process or with the use of a hydraulic press. A Vailling process is where the tube or shaft is formed by pushing it into a die, over a mandrel, or a combination of both. Swaging uses hammers to beat the metal into a different shape. The material changes that occur during these process are different and sometimes the processes can not be interchanged due to finished component material requirements. In general, Vailling hardens a material, and therefore, without annealing, can not work the material as much. Preferably, the lock collar 2 is swaged on the steering column tube 1. Also, preferably, the lock collar 2 is swaged on the steering column tube 1 as the tube 1 is being formed.

The swaging process is arranged such that a certain predetermined amount of torque resistance is provided between the tube 1 and lock collar 2, the intention being that only a finite amount of torque is accepted and then rotation between the two parts occurs at any value above that. Once the torque load drops below a critical predetermined level, the lock collar 2 must once again transmit torque from the tube 1. It is the intention that this relative movement can occur several times without significantly changing the critical torque value.

The swaging also has the effect of maintaining the relative axial position of the lock collar 2 at all times, even during a crash. The zone A—A indicates the swaging zone. The steering column tube 1 is divided into three axially extending portions 10, 11, 12 and the locking collar 2 is divided into two axially extending portions 13, 14. The diameter of the steering column tube first and third axially spaced portions 10, 12 is greater than the diameter of the steering column tube second axially spaced portion 11. The lock collar first axially spaced portion 13 is positioned about the steering column tube second axially spaced portion 11 and the diameter of the steering column tube first axially spaced portion is greater than the inner diameter of the lock collar first axially spaced portion 13. The inner diameter of the lock collar second axially spaced portion 14 can be greater than the outer diameter of the steering column first axially spaced portion 10 creating a clearance 20 between the lock collar second axially spaced portion 14 and the steering column first axially spaced portion 10.

If desired, an antifriction material 3 can be included and could, for example, be a plastics coating on the collar 2 or on the tube 1. Alternatively, or in addition, the material 3 could be in the form of a plastics tube which is also swaged between the tube 1 and collar 2.

The amount of torque required to make the lock collar 2 slip can be adjusted by varying the length of the swaged zone, the amount of force used in the swaging process or the amount and type of antifriction material, or any combination thereof.

The lock collar 2 has a number of circumferentially spaced slots 2A any one of which can be engaged by a lock pawl to lock the steering column and wheel.

Having described the invention, what is claimed is:

1. A lock assembly, for a steering column, comprising:

a cylindrical steering column tube having at least first, second, and third axially spaced portions, the second axially spaced portion being between the first axially spaced portion and the third axially spaced portion, the outer diameters of the first and third axially spaced portions being greater than the outer diameter of the second axially spaced portion;

a hollow cylindrical lock collar having at least two axially spaced portions, the first axially spaced portion having an inner diameter smaller than the inner diameter of the second axially spaced portion, one of the axially spaced portions having a plurality of circumferentially spaced axially extending slots, the lock collar being positioned about the steering column tube with the lock collar first axially spaced portion being positioned about the steering column tube second axially spaced portion, the outer diameters of the first and third axially spaced portions of the steering column tube being greater than the inner diameter of the first axially spaced portion of the lock collar, such that the lock collar is unable to move axially relative to said steering column tube, and wherein the lock collar first axially spaced portion is characterized by plastic deformation after the steering column tube is inserted into the lock collar to such a degree as to resist relative rotation between said collar and said steering column tube below a predetermined torque value and to permit relative rotation above said predetermined torque value; and means for engaging at least one of said axially extending slots to lock said steering column.

2. The lock assembly according to claim 1, wherein the first axially spaced portion of the lock collar is plastically deformed by swaging.

3. The lock assembly according to 1, wherein the first axially spaced portion of the lock collar is plastically deformed by vailling.

4. The lock assembly according to claim 1, wherein the first axially spaced portion of the lock collar is plastically deformed by hydraulic pressing.

5. The lock assembly according to claim 1, further comprising:

a plastic layer between the first axially spaced portion of the lock collar and the second axially spaced portion of the steering column tube.

6. The lock assembly according to claim 1, wherein the second axially spaced portion of the lock collar is positioned about the first axially spaced portion of the steering column tube, and the inner diameter of the second axially spaced portion of the lock collar is greater than the outer diameter of the first axially spaced portion of the steering column tube, thereby forming an open annular clearance between the second axially spaced portion of the lock collar and the first axially spaced portion of the steering column tube.

7. The lock assembly according to claim 6, wherein the plurality of circumferentially spaced axially extending slots are in the second axially spaced portion of the lock collar.

* * * * *